United States Patent [19]

MacDonald

[11] Patent Number: 4,822,471

[45] Date of Patent: Apr. 18, 1989

[54] ACID EFFICIENT MEMBRANE FOR USE IN ELECTRODIALYSIS FOR RECOVERY OF ACID

[75] Inventor: Russell J. MacDonald, Watertown, Mass.

[73] Assignee: Ionics, Incorporated, Watertown, Mass.

[21] Appl. No.: 177,727

[22] Filed: Apr. 5, 1988

[51] Int. Cl.$^4$ .......... C25B 13/08; C25C 7/04; C08D 2/02

[52] U.S. Cl. .................. 204/301; 204/296; 521/27; 521/32; 521/38

[58] Field of Search ............ 204/296, 301; 521/27, 521/38, 32; 526/310

[56] References Cited

U.S. PATENT DOCUMENTS

| | | | |
|---|---|---|---|
| Re. 27,401 | 6/1972 | Wichterle et al. | 204/296 X |
| 2,915,481 | 12/1959 | Ayers et al. | 521/32 |
| 3,233,026 | 2/1966 | Richter, Jr. et al. | 521/32 X |
| 3,247,133 | 4/1966 | Chen et al. | 521/27 |
| 3,767,600 | 10/1973 | Albright | 521/38 |
| 4,052,343 | 10/1977 | Cunningham | 521/38 |
| 4,129,534 | 12/1978 | Cunningham | 521/38 |
| 4,216,073 | 8/1980 | Goldstein | 204/301 X |
| 4,231,855 | 11/1980 | Hodgdon et al. | 204/301 |
| 4,374,720 | 2/1983 | MacDonald | 521/38 |
| 4,505,797 | 11/1985 | Hodgdon et al. | 204/296 X |
| 4,587,269 | 5/1986 | Thomas, Jr. | 521/38 |

FOREIGN PATENT DOCUMENTS

| | | | |
|---|---|---|---|
| 867396 | 5/1961 | United Kingdom | 521/32 |
| 872218 | 7/1961 | United Kingdom | 521/27 |

*Primary Examiner*—John F. Niebling
*Assistant Examiner*—John S. Starsiak
*Attorney, Agent, or Firm*—Norman E. Saliba

[57] ABSTRACT

This invention is directed to the process and apparatus for making a polymeric membrane containing non-quaternized amine groups, with the polymer having substantially zero amounts of non-polymerized solvents. The resulting membrane is a more efficient anion membrane for recovering acid from acidic solutions by electrodialysis than the corresponding membranes containing quaternized amine groups. The membrane is made by polymerizing a monomeric mixture on a reinforcing cloth structure, which monomeric mixture is void of non-polymerizing solvents.

2 Claims, No Drawings

ACID EFFICIENT MEMBRANE FOR USE IN ELECTRODIALYSIS FOR RECOVERY OF ACID

BACKGROUND OF THE INVENTION

(1) Field of the Invention

This invention relates to an electrodialysis anion selective membrane which may be used for effectively recovering and concentrating an acid from dilute acid solutions, mixtures of acids and salts or mixtures of acids and water-soluble organic compounds by electrodialysis, and to methods of producing such membranes. More particularly, this invention relates to an anion electrodialysis membrane having a high current efficiency and low electrical resistance in acid solutions.

(2) Description of the Prior Art

The anion selective membrane of this invention retards the passage of hydrogen (H+) ions but readily allows the flow of anions such as chloride, (Cl−) ions when in contact with an acid-containing solution, and while under an applied D.C. potential. With such a membrane, one can efficiently concentrate or deacidify acidic solutions by the electrodialysis process.

Commercially available anion selective membranes such as for example the aliphatic quaternary ammonium anion exchange membrane described in U.S. Pat. No. 4,231,855 (Hodgdon, et. al.) permit substantial passage of hydrogen ions when used for the electrodialysis of acid solutions, resulting in poor anion transfer current efficiency and high equipment and energy costs. Such drawbacks have precluded the extensive application of electrodialysis to the processing of acid-containing solutions.

Uses for the novel membrane of the present invention are in the recovery of acid-containing solutions which become 'spent' when their salt concentration becomes too high, or where the acid concentration is too low. These types of acid/salt solutions are encountered in such operations as the metal finishing, plating and mining industries. At present, these acid/salt solutions have become a waste disposal problem for their respective industries since there are few efficient remedies to the problem of removing acids from 'spent' solutions and recovering said acid at useful concentrations.

SUMMARY OF THE INVENTION

The object of this invention is a novel electrodialysis membrane having a small transport number for hydrogen ions (H+) characterized by high anion transfer current efficiency and low power requirement (i.e. low voltage or low resistivity) for use in the separation and recovery of an acid from a mixture of an acid and a salt or an acid and an organic compound, and recovery of acid concentrations from acidic waste streams.

Another object of this invention is to provide a process for preparing novel electrodialysis anion selective membranes wherein the current efficiency and power requirements can be varied according to the compositions and ratios of the monomers used in the membrane formulation.

These objects and features of this invention can be obtained by forming a cloth reinforced sheet of a highly cross-linked, low porosity, high capacity non-quaternary polymer. This polymer sheet is comprised of (I) an ethylenic monomer of the class of acrylates, methacrylates, acrylamides or methacrylamides containing one or more non-quaternized amine groups preferably of the tertiary type but not excluding the secondary or primary amine groups and (II) one or more multiple-ethylenic cross-linking (X-L) monomers of the class of acrylates, methacrylates, acrylamides or methacrylamides. The monomers are caused to polymerize together in and on the cloth backing material and the resulting reinforced polymer sheet is allowed to swell by soaking in an aqueous acid. This process results in an anion-exchange membrane containing very low void volume, high ion-exchange capacity and low electrical resistance.

The important and novel concept of the present invention is preparing a membrane whereby the entire pre-mixed monomer solutions are caused to harden into and onto a cloth backing to form a continuous, non-ionogenic, reinforced polymer sheet containing 100% solids, i.e., no inherent voids or porosity. The polymer sheet is then placed into an aqueous acid solution whereby a chemical acid-base reaction takes place between the amine-containing portion of the polymer and the acid in solution. This causes the membrane to swell and become ionogenic by forming positively charged ammonium ions. The swelling and imbibing of the aqueous acid causes channels to form in the membrane sheet whereby water may move freely throughout the membrane while restricting the movement of acid.

I have discovered experimentally that the higher the charge density of ammonium groups that can be achieved in the polymer coupled with the lowest uptake of water (i.e., lowest water content) optimizes the ultimate rejection of acid throughput of the membrane and gives the lowest energy requirement.

In order to construct an efficient membrane system, one must construct a membrane that has a high rejection rate for H+ ions coupled with a high rate of passage of anions (i.e., low electrical resistance). The present state-of-the-art anion-exchange membranes pass H+ ions along with the anions (in the opposite directions) giving very poor current efficiency in acid solutions. By constructing a membrane as described herein, a very high anion transfer current efficiency is achieved indicating a high rate of H+ ion rejection.

DETAILED DESCRIPTION OF THE INVENTION

Prior art ion-exchange membranes of the acrylic type used for high volume brackish water demineralization are made by dissolving a tertiary amine monomer, a cross-linking monomer and a polymerization initiator in a non-polymerizing (NP) solvent or diluent, impregnating a piece of cloth with the resulting solution between glass plates and thereafter heating the glass sandwich to form reinforced plastic or polymer sheets. The plastic sheets are removed from between the glass plates and then reacted with an alkylating agent to form quaternary ammonium groups on the membrane sheet. The porosity of the membrane is determined by the amount of diluent present in the monomer solution. Membranes of high porosity use large amounts of diluent so as to obtain high flux rates of ions through the membranes in order to demineralize large quantities of salt water.

I have discovered that the low porosity membranes of the present invention containing tertiary amine groups work best in restricting the flow of acid (H+) through the membranes.

The acid efficient membrane of the invention is prepared by co-polymerizing a tertiary amine monomer such as (DMAEMA) dimethylamino ethyl methacrylate with one or more cross-linking monomers such as (DEGDM) diethyleneglycol dimethacrylate onto a piece of cloth in the total absence of a non-polymerizing (NP) solvent but in the presence of an initiator such as Vazo 67®.

This membrane would have the following chemical structure:

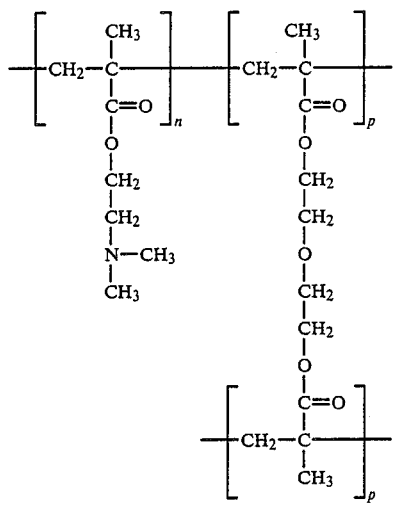

Where the mole fraction of n=0.01-0.5 and the mole fraction of p=0.99-0.5

The general structure for this membrane type would be:

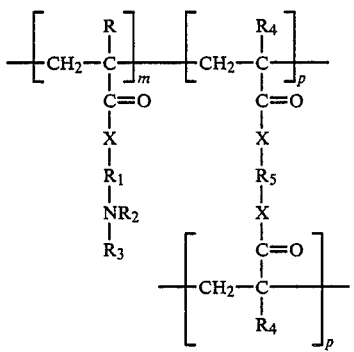

Where
R and $R_4$=H or $CH_3$,
$R_2$ and $R_3$=alkyl groups ($C_1$-$C_8$) or H,
$R_1$ and $R_5$=alkyl groups ($C_1$-$C_{10}$) or 1-10 alkyl ether groups

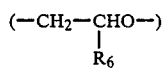

Where
$R_6$=alkyl groups ($C_1$-$C_{10}$),
X=O, NH or $NR_7$,
where $R_7$=alkyl groups ($C_1$-$C_{10}$)

The ethylenic monomers (I) containing non-quaternized amine groups i.e. primary, secondary or tertiary amine groups that may be used to make the membrane of this invention include for example:

dimethylamino ethyl methacrylate where R, $R_2$, $R_3$=$CH_3$, X=O, $R_1$=$(CH_2)_2$,
dimethylamino ethyl acrylate where R=H, $R_2R_3$=$CH_3$, X=O, $R_1$=$(CH_2)_2$,
dimethylamino propyl methacrylamide where R, $R_2$, $R_3$, =$CH_3$, X=NH, $R_1$=$(CH_2)_3$,
t-butylamino ethyl methacrylate where R=$CH_3$, $R_2$=H, $R_3$=$C(CH_3)_3$, X=O, $R_1$=$(CH_2)_2$.

The multiple-ethylenic cross-linking (X-L) monomers (II) that may be used to make the membrane of this invention include for example:

ethylene glycol dimethacrylate where $R_4$=$CH_3$, X=O, $R_5$=$(CH_2)_2$,
diethylene glycol dimethacrylate where $R_4$=$CH_3$, X=O, $R_5$=$(CH_2)_2$—O—$(CH_2)_2$,
trimethylol propane trimethacrylate where $R_4$=$CH_3$, X=O, $R_5$=$CH_2$—$C(CH_2$—$CH_3[CH_2OC(=O)C(CH_3)=CH_2]CH_2$—
methylene bisacrylamide where $R_4$=H, X=NH, $R_5$=$CH_2$.

The characteristics of the resulting acid-blocking electrodialysis membranes are dependent upon the composition of monomers (I) and (II). The membranes are made by using 10-70 parts by weight, (preferably 30-50 parts by weight) of the cross-linking monomer (II) per 100 parts by weight of the monomer (I). A thermal polymerization initiator or a photosensitizer may be added to the resulting monomeric mixture of (I) and (II). When thermal methods of polymerization are used, it is desirable to use a polymerization initiator such as benzoyl peroxide, α,α'-azobisisobutyronitrite, etc. If photopolymerization is used, it is desirable to use a photosensitizer such as benzoin, benzoin methylether, or α,α'-azobisisobutyronitrile. If radiation polymerization methods are used, polymerization can be conducted without an initiator. The quantity of polymerization initiator or photosensitizer when used may range in amounts of from 0.1 to 2 parts by weight per 100 parts by weight of the monomers mixture (I) and (II).

Other monomers may also be included in the monomer mixture, which will copolymerizable with monomers (I) and (II) such as for example acrylic or methacrylic esters, acrylamides and methacrylamides.

EXAMPLE 1

To a mixture of 500 mls. of dimethylamino ethyl methacrylate and 500 ml of ethylene glycol dimethacrylate is added 5 gms. of 2,2'-azobis (2-methylpropionitrile). The resulting solution which is void of any non-polymerizable solvents is poured into a mylar-lined 10½"×11½" tray. Glass and modacrylic cloth of 10"×11" size is added alternately to form a package of twelve cloth layers. The package is heated in an oven to 80° C. for 12 hours. The solid, polymerized package is taken apart yielding twelve polymer-impregnated, cloth-backed sheets. The reinforced sheets are then placed in a 2N Hydrochloric acid solution and allowed to swell until equilibrium is reached. The resulting anion membranes can then used in an electrodialysis apparatus to upgrade a mineral acid stream for example, spent pickle liquor.

EXAMPLE 2

A three compartment electrodialysis test cell was used to determine the current efficiency (C.E.) of the membrane of the present invention as a comparison with those of the prior art when used in an acid solution. The cell comprised a cathode and anode electrode of platinum coated titanium located at the terminal ends of the cell with two membranes located therebetween and positioned from each other and from the electrodes with gasketed spacers to form liquid containing compartments. Thus the arrangement was as follows: the cathode electrode, the cathode compartment, the anion exchange membrane to be tested, the middle compartment, a commercially available type cation exchange membrane (Ionics, Inc. CR61-AZL), the anode compartment and finally the anode electrode.

The membranes mounted in the test cell had an active membrane area of 25 cm$^2$ and each compartment had a liquid volume of about 40 ml each and a cross-sectional active area of 25 cm$^2$. The solution in the cell comprised 1N HCl in the cathode compartment, 0.5N HCl in the center compartment and 0.5N H$_2$SO$_4$ in the anode compartment. The solutions were stirred by use of a magnetic stirrer and maintained at a temperature of 25° C. Each test run operated at 20 ma/cm$^2$ for a 20 minute period at which time the acid concentrations in the cell were determined by titration. The results were as follows:

|      | Anion Membrane | % C.E. |
| --- | --- | --- |
| (1.) | Quaternary ammonium type as per U.S. Pat. No. 4,231,855 | 40.0% |
| (2.) | Non-quaternized tertiary amine of type (1.) above containing non-polymerizable solvents during manufacture. | 67.8% |
| (3.) | Acid efficient membrane of the present invention - i.e. a non-quaternized tertiary amine type containing zero non-polymerized solvents during manufacture. | 80.2% |

It is readily noted from the above data that the membrane of the present invention is substantially more efficient over the membranes of the prior art when used in an acid environment.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

I claim:

1. The process for preparing a aliphatic, weak base anion exchange polymeric membrane of low void volume, high ion exchange capacity and low electrical resistance having a woven or non-woven cloth reinforcing structure, the polymer of said membrane prepared by the process comprising copolymerizing in the absence of non-polymerizable solvents about 50 to 90 mol percent of at least one multiple-ethylenic cross-linking monomer compound selected from the group consisting of ethylene glycol dimethacrylate, polyethylene glycol dimethacrylate, tri methylol propane trimethacrylate, methylene bismethacrylamide, neopentyl glycole dimethacrylate, bis-phenol A dimethacrylate, pentaerythritol trimethacrylate and penta erythritol tetra methacrylate with about 50 to about 1 mol percent respectively of a methacrylate ester salt monomer compound of the formula:

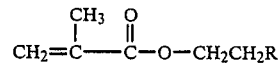

Where R is an ion exchange moeity of a non-quarternized ammonium group selected from primary, secondary and tertiary amines, said resulting solvent free polymer having substantially no inherent voids due to the absence of non-polymerized solvents in the monomers during manufacture.

2. An electrodialysis apparatus for recovering acid values comprising at least one aliphatic, weak base anion exchange polymeric membrane of low void volume, high ion exchange capacity and low electrical resistance having a woven or non-woven cloth reinforcing structure, the polymer of said membrane prepared by the process comprising copolymerizing in the absence of non-polymerizable solvents about 50 to 99 mol percent of at least one multiple-ethylenic cross-linking monomer compound selected from the group consisting of ethylene glycol dimethacrylate, polyethylene glycol dimethacrylate, tri methylol propane trimethacrylate, methylene bismethacrylamide, neopentyl glycol dimethacrylate, bis-phenol A dimethacrylate, pentaerythritol trimethacrylate and penta erythritol tetra methacrylate with about 50 to about 1 mol percent respectively of a methacrylate ester salt monomer compound of the formula:

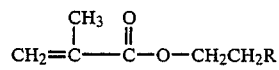

Where R is an ion exchange moeity of a non-quarternized ammonium group selected from primary, secondary and tertiary amines, said resulting solvent free polymer having substantially no inherent voids due to the absence of non-polymerized solvents in the monomers during manufacture.

* * * * *